Sept. 22, 1959     E. E. SMITH ET AL     2,905,741
RESERVE PRIMARY BATTERY
Filed May 1, 1956
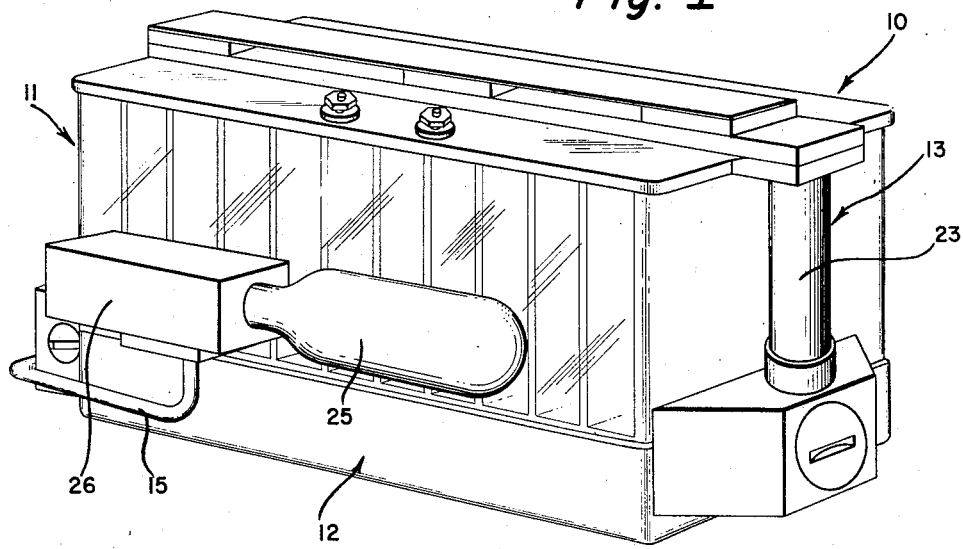
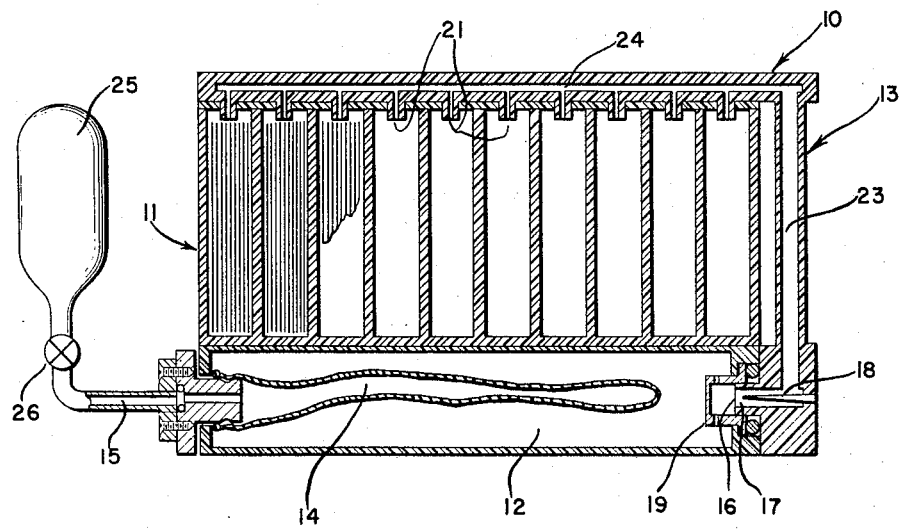
Eugene E. Smith
Fred W. VanKirk
*INVENTORS*
BY
ATTORNEY United States Patent Office 2,905,741
Patented Sept. 22, 1959

2,905,741

RESERVE PRIMARY BATTERY

Eugene E. Smith and Fred W. Van Kirk, Los Angeles, Calif., assignors to Hughes Aircraft Company, Culver City, Calif., a corporation of Delaware Application May 1, 1956, Serial No. 582,623

2 Claims. (Cl. 136—90)

The present invention relates to primary batteries, and more particularly to a reserve primary battery which may be remotely activated.

Conventional primary or electrolytic cells are subject to a self-discharging action during storage, and it is therefore highly desirable that the batteries be maintained in an inactive condition until immediately prior to placing the battery in service. Heretofore, it has been proposed that the electrolyte for the cells be maintained in a separate chamber from the cells, the electrolyte chamber preferably being housed within the battery case but normally isolated from the cells of the battery until such time as it is desired to activate the battery. While it is possible to utilize a separate chamber or reservoir for the electrolyte for each of the cells of the battery, it is obvious that a considerable simplification in the structure of the battery and the equipment necessary to accomplish its activation may be achieved if a single chamber can be utilized as the reservoir for the electrolyte to be injected into a plurality of cells.

Unfortunately, such a construction presents a number of problems which have heretofore only been partially solved. Since the electrolyte itself is a conductor of electricity, particular care must be taken to prevent the formation of short circuit paths between the cells through the common electrolyte reservoir. It is also necessary to ensure an equal distribution of electrolyte from the reservoir into each of the cells of the battery. The common reservoir batteries previously proposed generally rely on gravity or centrifugal force to achieve equal distribution of electrolyte from the common reservoir. Such batteries, while reliable for operation under the conditions for which they were designed, quite obviously cannot be used under conditions where it is impossible to predict or control the position in which the battery will be operated.

It is, therefore, an object of the present invention to provide an improved reserve primary battery in which the electrolyte for a plurality of cells is stored in a single chamber or reservoir prior to activation.

A further object of the present invention is to provide an electrolytic battery of the class described which is not dependent on either position or motion to assure its proper operation.

A further object of the present invention is to provide a battery of the class described which utilizes a common reservoir for the electrolyte to be injected into a plurality of cells and includes means for preventing excessive discharge of the cells through any electrolyte remaining within the common electrolyte reservoir.

Yet another object of the present invention is to provide a remotely activated reserve primary battery which is simple in construction and positive in operation, utilizing a common electrolyte reservoir for a plurality of cells, and being arranged to provide for an equal distribution of electrolyte among the cells of the battery.

A reserve primary or electrolytic battery, according to the present invention, comprises a plurality of battery cells, each containing a set of battery plates, an electrolyte reservoir, an electrolyte manifold interconnecting the reservoir and each of the cells of the battery, and means for forcing electrolyte from the reservoir into each of the cells. The portions of the electrolyte manifold interconnecting each of the cells, while of sufficient dimension to permit the ready flow of electrolyte therethrough, are sufficiently long and small in cross-sectional area to insure a leakage path through the electrolyte in the manifold between cells which is of insufficient conductivity to seriously detract from the performance of the battery. In addition, the reservoir, cells, and manifold are sealed against atmospheric pressure in order to ensure the equal distribution of electrolyte among the cells of the battery upon activation.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only, and is not intended as a definition of the limits of the invention.

Fig. 1 is a perspective view of a battery provided with electrolyte charging means constructed in accordance with the present invention; and Fig. 2 is a side elevational view in cross section of the battery of the present invention.

Referring now to Figs. 1 and 2, wherein like reference characters refer to the same elements in the several views, a reserve primary battery according to the present invention comprises a container or case 10, having a cell portion generally defined by the numeral 11 and an electrolyte reservoir portion 12. Cell portion 11 comprises a plurality of cell sections for receiving positive and negative battery plates, each cell section forming a battery cell. For convenience of illustration, the battery plates are symbolically shown in Fig. 2, being disposed within each cell in a conventional manner. An electrolyte manifold 13 is arranged to interconnect electrolyte reservoir 12 and each of the cells of the battery for conducting electrolyte from the reservoir to the cells upon activation of the battery in a manner to be described.

More particularly, as depicted most clearly in Fig. 2, cell portion 11 of the battery is positioned to occupy the upper portion of battery case 10, while electrolyte reservoir 12 is positioned to occupy the bottom or lower portion of battery case 10. Manifold 13 is connected to reservoir 12 at one side of the battery case, preferably the end of the reservoir and is arranged to form a conductive passage for electrolyte from the reservoir into another side of the top of each of the cells in cell portion 11. The manifold, accordingly, comprises two sections, a vertical transmission section 23, and a discharging section 24 arranged to pass across the top of each of the cells, the manifold discharging section being adapted to discharge electrolyte into each cell through a plurality of electrolyte nozzles 21.

As will be explained more fully hereinafter, the arrangement of the manifold in the manner depicted contributes to the utility of the present invention for operation with the battery in any position without danger of electrolyte being returned to the reservoir through the action of gravity or failure of the activating mechanism.

Electrolyte reservoir 12 contains, in addition to the electrolyte for the battery, a thin, flexible bladder 14 which is arranged to be inflated by means of pressure applied to the bladder from an external source through an inlet 15. As will be readily understood, inflation of bladder 14 will displace electrolyte from reservoir 12, causing the electrolyte to flow from the reservoir into the manifold and into the cells of the battery. In order to prevent electrolyte from flowing from the reservoir prior to activation, as during normal handling and movement, a thin frangible diaphragm 16 covers the port 17 between the reservoir and manifold. A puncture needle 18 is provided opposite frangible diaphragm 16 to puncture the diaphragm when the diaphragm deflects under pressure of the electrolyte following activation of the battery. In addition, a ported cap 19 is provided to cover port 17, the cap functioning to prevent the distended bladder from impinging against needle 18 and being ruptured thereby.

Electrolyte manifold 13, as shown in Fig. 2, is arranged for passing electrolyte from electrolyte reservoir 12 upon activation of the battery to each of the cells of the battery, and accordingly is provided with a plurality of electrolyte nozzles 21, including one nozzle for each cell of the battery, for passing electrolyte from the manifold into each cell. Ordinarily, the amount of electrolyte in the reservoir will be proportioned to correspond to the total quantity required to activate all of the cells of the battery. It will readily be understood that if the reservoir contains an excess of electrolyte over that absorbed by each of the cells so that a quantity remains in the manifold following activation, short circuit paths through the electrolyte may be formed. Similarly, inversion of the battery may cause the electrolyte in the cells to flow back into the manifold, again forming short circuit paths. In order to reduce the current drain through short circuit paths to a minimum value which will not seriously detract from the operation and normal use of the battery, each of nozzles 21 and the electrolyte path in manifold 20 should be dimensioned to provide as small a cross-sectional area and as long a path between cells as is feasible.

On the other hand, electrolyte manifold 13 and the nozzles must be dimensioned to provide that electrolyte be equally divided among the cells regardless of their number. Since the nozzles are at varying distances from the electrolyte reservoir and are fed by a common manifold, an equal distribution of the electrolyte could ordinarily only be achieved by tapering the manifold or the nozzles or both to provide equal pressure at each nozzle, despite the fact that the nozzles are not equi-distant from the source of pressure.

Such a variation in size of manifold and nozzle, while useful in achieving an equal distribution of electrolyte among the cells of the battery, would seriously interfere with the previously stated requirement that all nozzles and the manifold have as small a cross-section as possible and as long a path between nozzles as is feasible. While the nozzles closest to the electrolyte reservoir could be dimensioned to have such a minimum cross-section, the nozzles more remotely located from the reservoir would be of a dimension far in excess of this minimum value. At the same time the requirement that the battery be activated within a short period of time after the application of pressure to bladder 14 determines a minimum nozzle diameter required to achieve the desired rate of fluid flow.

The present invention satisfies the above requirements by providing that each of the cells be sealed against atmospheric pressure, the only aperture in each cell being provided to permit entry of electrolyte through the electrolyte nozzle. It has been found that under such conditions electrolyte manifold 13 may be dimensioned to have a uniform cross-section throughout its discharging section 24 and each of the nozzles 21 may be dimensioned to have an identical cross-section, at the same time achieving an equal distribution of electrolyte to each of the cells of the battery upon activation. Thus, as shown in Fig. 2, common electrolyte manifold 13 is arranged to pass from the reservoir and over each of the cells of the battery. Manifold 13 has a uniform cross-sectional area throughout its discharging section 24, and an equal or greater cross-sectional area throughout its transmission section 23. The manifold is connected to each of the cells of the battery by an electrolyte nozzle 21, each electrolyte nozzle having an equal cross-sectional area less than the cross-sectional area of the manifold. If the battery is sealed in the manner described, activation of the battery will produce an equal distribution of electrolyte among its various cells.

Considering now the activation of the battery thus described, high pressure gas applied to inlet 15 from pressure tank 25 following the opening of pressure release valve 26 will expand in bladder 14. This pressure will be transmitted through the electrolyte to deflect the frangible diaphragm 16. As soon as the pressure has risen to a point at which the diaphragm has deflected against puncture needle 18, the needle will pierce the diaphragm and the electrolyte under pressure will flow through the opening and into manifold 23 and from thence into each of the cells of the battery. Ordinarily, the amount of electrolyte in reservoir 12 will be proportioned to provide sufficient electrolyte for each of the cells which will, as soon as the battery is activated, be distributed equally among the various cells of the battery. While the electrolyte reservoir is disposed beneath the battery, the electrolyte is forced into each cell from the top and, accordingly, maintaining the electrolyte in the cells is not dependent upon the continuous application of pressure to the bladder. At the same time, the physical inversion of the battery will cause only a small quantity of electrolyte to flow into the manifold as the liquid in the cells and manifold seek a common level. It may therefore be seen that once the battery is activated the continued performance of the battery is not dependent upon the activating mechanism.

A battery constructed in accordance with the principles of the present invention was found to be capable of developing full power within two seconds following activation.

There has thus been described an improved reserve primary battery in which the electrolyte for a plurality of cells is stored in a single chamber or reservoir prior to activation of the battery and passed in equal portions into each of the cells of the battery upon activation.

What is claimed as new is:

1. In a delayed action battery having a case, a plurality of cells in said case, electrolyte filling openings at upper ends of each of said cells and a common manifold interconnecting said openings, the combination with said battery of an electrolyte supply and delivery apparatus comprising: a container for said electrolyte, said container being disposed in association with said battery and on a side thereof remote from said openings and said manifold; a bladder in said container; means for inflating said bladder; and passage means disposed between said container and said manifold for conducting electrolyte thereto upon inflation of said bladder, said passage means disposed parallel to axes extending individually through each of said cells and said filling openings thereof, said passage means having a volumn substantially less than the volume of any one of said cells, whereby, upon inversion of said battery and deflation of said bladder, to permit electrolyte outflow from said cells only to an extent wherein common levels are established in said cells and said passage means.

2. A delayed action battery according to claim 1 wherein said container is secured to a lower surface of said battery case.

References Cited in the file of this patent

UNITED STATES PATENTS

| | | |
|---|---|---|
| 851,353 | Hite | Apr. 23, 1907 |
| 2,529,511 | Murphy | Nov. 14, 1950 |
| 2,594,879 | Davis | Apr. 29, 1952 |
| 2,674,946 | Hjelm | Apr. 13, 1954 |

FOREIGN PATENTS

Y136IVa/21b    Germany _____ Nov. 15, 1956